Sept. 20, 1971         B. FUTTERER         3,605,264
SHAVER WITH A TWIN-FOIL CUTTING HEAD
Filed Sept. 18, 1968

United States Patent Office 3,605,264
Patented Sept. 20, 1971

3,605,264
SHAVER WITH A TWIN-FOIL CUTTING HEAD
Bodo Futterer, Schonbuhlring, Switzerland, assignor to
The Gillette Company, Boston, Mass.
Filed Sept. 18, 1968, Ser. No. 760,524
Claims priority, application Switzerland, Sept. 18, 1967,
13,057/67
Int. Cl. B26b 19/06, 19/10, 19/38
U.S. Cl. 30—34.1        3 Claims

ABSTRACT OF THE DISCLOSURE

A two foil shaving head for dry shavers, the inner foil having projecting teeth for cutting long hairs. The projecting teeth form an acute angle with their corresponding cutting openings and have recesses therein for better abutment of the cutting teeth against the curved outer foil.

BACKGROUND AND OBJECTS

The present invention concerns a shaver with a twin-foil cutting head having an inner foil and an outer foil which are provided with cutting openings and along at least one edge have slots for cutting long hair, the foils in the region of the slots being bent at right angles and one foil in the region of the slots having cutting teeth, and being so bent at right angles that the cutting teeth are exposed, such as is disclosed in U.S. patent application Ser. No. 651,492, now Patent No. 3,517,441.

The object of the invention is to modify a shaver with a twin-foil cutting head of the kind referred to above in such a manner that a better cutting action for long hair is obtained. The solution is provided substantially by the fact that the cutting teeth have recesses.

SUMMARY OF THE INVENTION

The clearance between the cutting teeth and the outer foil is preferably less than 0.1 mm.. In the range of between 0.3 and 0.1 mm. a progressive improvement of the cutting effect for long hair is obtained.

In accordance with a further development of the invention the cutting teeth with the associated cutting edges of the outer foil form an acute angle of more than 5 degrees. A particularly good cutting action is obtained when the angle is in the order of magnitude of 20 degrees.

BRIEF DESCRIPTION OF THE DRAWINGS

The invention will be described further, by way of example, with reference to the accompanying drawings, in which.

DETAILED DESCRIPTION OF THE INVENTION

Figure 1:
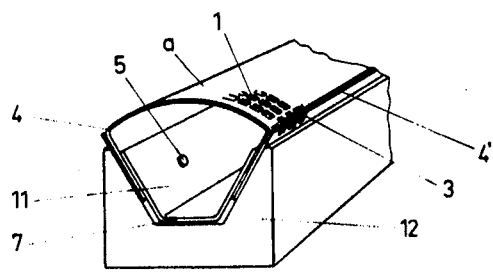
FIG. 1 is a perspective view of an outer foil of the twin-foil cutting head.

FIG. 1 shows a cutting foil $a$ acting as an outer foil which, by means of pins or studs 5 and a trough-shaped inner holding part 7, is clamped with pre-tensioning in a solid holder 12. The outer foil $a$ has perforations 1 which serve for the cutting of short hair. Slots 3 are formed along the edges 4 and 4' of the outer foil.

Figure 2:
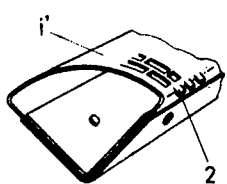
FIG. 2 is a perspective view of an inner foil of the twin-foil cutting head.

FIG. 2 shows an inner foil $i'$ of the twin-foil cutting head which along its edges is provided with projecting cutting teeth 2. The inner foil $i'$ is clamped in V-shaped holding parts and in this state is inserted in the interior space 11 of the outer foil $a$.

Figure 3:
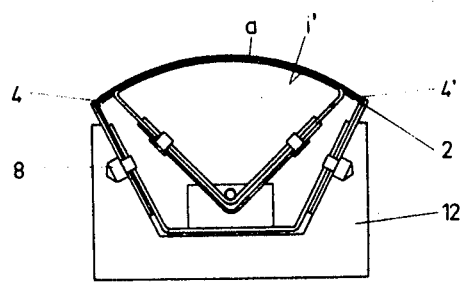
FIG. 3 is a sectional view through the assembled twin-foil cutting head.

FIG. 3 shows the twin-foil cutting head in the assembled state. It will be seen that the cutting teeth 2 project from the edges of the inner foil $i'$ and extend close to the edges 4 or 4' of the outer foil $a$.

In accordance with the invention the overall clearance of the inner foil $i'$ in the outer foil $a$ which thus corresponds to the sum of the clearance of the external edges 22 of the cutting teeth 2 (FIG. 4) from the associated inner edges of the outer foil $a$, is less than 0.3 mm. and preferably less than 0.1 mm.

Figure 4:
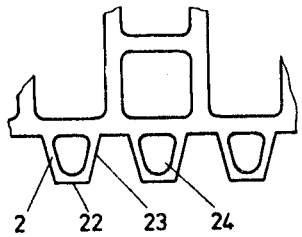
FIG. 4 shows on an enlarged scale a section of the inner foil in the region of the cutting teeth.

A detailed portion of an inner foil $i'$ in the region of the cutting teeth 2 is shown in FIG. 4. In accordance with the invention, the cutting teeth 2 have an angle of 20 degrees between their cutting edges 23 and the associated cutting edges of the slots 3 of the outer foil $a$. This angle may be varied over a certain range, but should not be smaller than 5 degrees.

In accordance with FIG. 4, the cutting teeth have recesses 24 which provide a better abutment of the cutting teeth against the curved outer foil $a$ thus causing the cutting action to be still further improved.

A twin-foil cutting head constructed in accordance with the invention has an excellent cutting action in the long hair region and does not lead to skin irritation.

I claim:

1. A twin-foil cutting head for use in dry shavers comprising:
   (a) an inner foil,
   (b) an outer foil positioned adjacent to and cooperating with said inner foil,
   (c) said outer foil having cutting openings therein,
   (d) said outer foil also having a plurality of slots for cutting long hair positioned along at least one edge thereof,
   (e) said inner foil having a plurality of cutting openings,
   (f) a plurality of cutting teeth projecting outwardly from said inner foil,
   (g) said inner foil cutting openings cooperating with said outer foil cutting openings for cutting short hairs,
   (h) said projecting cutting teeth cooperating with said slots for cutting long hairs,
   (i) said projecting cutting teeth being provided with recesses therein confined only to said teeth for better abutment of said projecting cutting teeth against said outer foil,
   (j) said inner foil having at least one downwardly directed side, said projecting teeth being at substantially right angles relative to said side, and
   (k) said projecting cutting teeth having cutting edges which form an angle of about 20° with the cutting edges of said slots.

2. A twin-foil cutting head for use in dry shavers as defined in claim 1 wherein the ends of the projecting teeth are spaced a distance not greater than approximately 0.3 mm. from said outer foil.

3. A twin-foil cutting head for use in dry shavers as defined in claim 2 wherein said distance is less than approximately 0.1 mm.

References Cited
UNITED STATES PATENTS

| 3,201,178 | 8/1965 | Okubo | 30—34.1 |
| 3,436,822 | 4/1969 | Heyek | 30—34.1 |
| 3,453,909 | 7/1969 | Yager | 30—34.1X |

OTHELL M. SIMPSON, Primary Examiner